United States Patent
Cortez et al.

(10) Patent No.: US 7,298,695 B1
(45) Date of Patent: Nov. 20, 2007

(54) METHOD AND APPARATUS FOR DELAYING START OF RESTORATION OF LOW PRIORITY SERVICES

(75) Inventors: Bruce Gilbert Cortez, Marlboro, NJ (US); Sanja Durinovic-Johri, Aberdeen, NJ (US); Pravin Kumar Johri, Aberdeen, NJ (US); John Paggi, Bayville, NJ (US); Simon S Zelingher, Morganville, NJ (US)

(73) Assignee: AT&T Corp., New York, NY (US)

( * ) Notice: Subject to any disclaimer, the term of this patent is extended or adjusted under 35 U.S.C. 154(b) by 1089 days.

(21) Appl. No.: 10/378,388

(22) Filed: Mar. 3, 2003

Related U.S. Application Data

(60) Provisional application No. 60/401,148, filed on Aug. 5, 2002.

(51) Int. Cl.
*H04J 1/16* (2006.01)

(52) U.S. Cl. ............................ 370/218; 370/244; 714/2

(58) Field of Classification Search ......... 370/216–228, 370/241–252, 375, 389, 380, 369; 714/4, 714/2, 418, 712; 361/72; 709/224, 220–222
See application file for complete search history.

(56) References Cited

U.S. PATENT DOCUMENTS

| | | | |
|---|---|---|---|
| 3,878,436 A * | 4/1975 | Bogel | 361/72 |
| 6,925,054 B1 * | 8/2005 | Atterton et al. | 370/218 |
| 2002/0178397 A1 * | 11/2002 | Ueno et al. | 714/4 |
| 2004/0114595 A1 * | 6/2004 | Doukai | 370/389 |
| 2007/0041316 A1 * | 2/2007 | Chaudhuri | 370/218 |

* cited by examiner

*Primary Examiner*—John Pezzlo

(57) ABSTRACT

The present invention relates generally to restoration of low priority services in a network. More particularly, the invention encompasses a method and an apparatus for delaying the start of the restoration of low priority services in a communication network. The invention further includes multiple schemes for restoring low priority services. The network could consist of optical, ATM, FR, or IP/MPLS switches and cross-connects.

46 Claims, 6 Drawing Sheets

METHOD AND APPARATUS FOR DELAYING START OF RESTORATION OF LOW PRIORITY SERVICES

CROSS-REFERENCE TO RELATED APPLICATION

The present invention is related to Provisional Patent Application Ser. No. 60/401,148, filed on Aug. 5, 2002, entitled "A scheme for delaying the start of restoration of low priority services," the disclosure of which is incorporated herein by reference.

FIELD OF THE INVENTION

The present invention relates generally to restoration of low priority services in a network. More particularly, the invention encompasses a method and an apparatus for delaying the start of the restoration of low priority services in a communication network. The invention further includes multiple schemes for restoring low priority services.

BACKGROUND INFORMATION

This invention relates to circuit-based communication networks, such as an optical switch or optical cross connect network, an ATM network, a Frame Relay network, a network of MPLS (Multi-Protocol Label Switching) enabled label switched routers, a network of Lambda (optical wavelength) routers, to name a few. In all such networks, circuits are provisioned between pairs of switches and numerous classes of services are carried on these circuits. Certain classes of circuits can be given preferential treatment over others. For example, there may be two classes of service—Premium and Basic—and Premium service circuits may receive priority treatment over any Basic service circuit.

These communication networks also consist of a number of switches which are connected by communication links. There could be multiple links between a given pair of switches and not every pair of switches needs to be connected to each other. Links could be of various sizes that are generally expressed in bandwidth units such as DS3, OC3, OC12, OC48, to name a few.

All of these networks use routing and signaling protocols to automate a variety of functions, such as, for example, self-discovery of network resources, construction and maintenance of an identical link-state database of routing information across all switches (within an "Area", "Peer Group," etc.), automatic provisioning and restoration of circuits, determination of paths for provisioning and restoration of circuits, detection of network failure conditions, flooding of information related to any change in the state of the network to all switches, including failures of switches and links, change in available bandwidth on a link, to name a few.

The routing and signaling protocols, including OSPF, MPLS, PNNI, etc. and variants of these standard protocols, have been adapted to specific networks or applications.

These networks are characterized by the fact that the intelligence is distributed in every switch and is not centralized in one or more central locations. Typically, all switches run the same set of protocols although the functions performed by the switches may vary somewhat based on how switches are used. For example, "border switches" in an OSPF area have greater functionality than other switches. Thus, the switches while employing the same or similar protocols operate independently of each other. Any co-ordination of activities between switches is done by sending messages to each other in ways prescribed by the routing and signaling protocols.

Communication circuits are established over a path or a sequence of links and switches through the network. Ties between equally desirable paths are typically broken in arbitrary but fixed order. The problems with restoration of circuits are also all well known in the art. There are many solutions that have been proposed and some have been implemented. For example, one current routing protocol always picks the shortest path with available capacity.

While the routing protocols aim at disseminating network state information throughout the network in a timely fashion, this process also uses up valuable processing resources to formulate the routing messages and to send them out, as well as to assimilate the information that is received from the routing messages. Consequently, there is a trade-off between the rate at which routing messages are sent with updated network information, and the amount of processing resources devoted to process just the routing messages. In order to address this concern, various timers are used by the routing protocols (as well as the signaling protocols) to control the rate at which these messages are sent. For example, updates of available bandwidth on a link may be sent no more than once every second and, therefore, the routing information may not be completely up to date. This is particularly true when a number of network events happen in a short amount of time, as is typically the case during a network failure involving the release and restoration of many circuits.

Also, in any large network failure scenario when multiple circuits are affected, there will be multiple switches that are source switches to these failed circuits. These switches initiate restoration in a "distributed" fashion, that is, without any co-ordination between the various switches. It is also well established that restoration for a failed circuit starts as soon as the source switch receives a release message for that circuit. Furthermore, the switches invoke the same algorithm for obtaining restoration paths and generally have identical link-state routing databases on which this path is calculated.

It is also well known that each individual switch maintains the priority order between the different service types of the failed circuits sourced on that switch, but it has no way of assuring that priority order across all the switches involved in the restoration is maintained or synchronized. In fact, it is well known in the art that under some circumstances Basic circuits sourced on one switch can start to restore before Premium circuits sourced on another switch have had a chance to restore; one reason could be simply because of the number of failed Basic and Premium circuits sourced at each switch. For example, the first switch may have just a few Premium circuits that may have failed, while the second switch may have had more Premium circuits that have failed. And, as soon as the first switch initiates the restoration of its share of Premium circuits, it would then start on the restoration of its Basic circuits, while the second switch would still be working on its Premium circuits. Having Basic circuits compete with Premium circuits for remaining network resources may compromise the performance of Premium circuits. Thus, there is a need for a method that assures that Premium circuits are restored before Basic circuits, at least with a high probability, and that the restoration of Basic circuits does not interfere with the restoration of Premium circuits.

This invention overcomes the problems of the prior art. The invention works to restore low priority services in a network. More particularly, the invention encompasses a method and an apparatus for delaying the start of the restoration of low priority services in a communication network. This leads to an efficient process for all service restoration.

PURPOSES AND SUMMARY OF THE INVENTION

The invention is a novel method and an apparatus for delaying the start of the restoration of low priority services in a communication network. Therefore, one purpose of this invention is to delay the start of the restoration of low priority services in a communication network. Another purpose of this invention is to provide restoration of communication service in a very efficient and economical manner.

One aspect of this invention comprises a method for restoring failed circuits within a communication network, comprising the steps of: (a) identifying at least one failed circuit, and (b) triggering at least one delay parameter for the restoration of the failed circuit.

Another aspect of this invention comprises a method for restoring failed circuits within a communication network, comprising the steps of: identifying at least one failed circuit, and triggering at least one schedule for the restoration of the failed circuit.

Still another aspect of this invention comprises a program storage device readable by machine, tangibly embodying a program of instructions executable by the machine to perform method steps for restoring failed circuits within a communication network, the method steps comprising: (a) identifying at least one failed circuit, and (b) triggering at least one delay parameter for the restoration of the failed circuit.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, both as to organization and method of operation, may best be understood by reference to the detailed description which follows taken in conjunction with the accompanying drawings in which:

DETAILED DESCRIPTION

Figure 1:
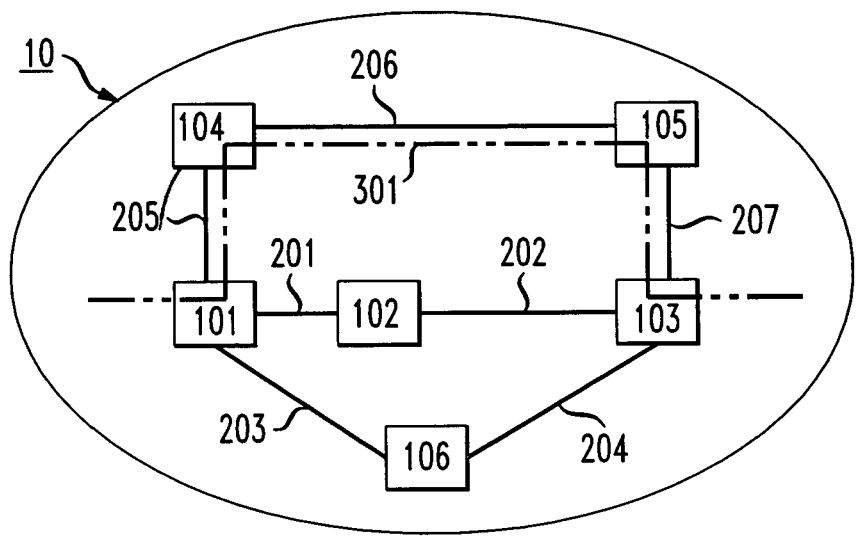
FIG. 1 is an exemplary network which is used to illustrate the present invention.

The prior art provides a plurality of methods and apparatus for provisioning a new (service) circuit. For example, a new circuit order between a pair of switches may be provisioned as follows:
  (a) One of the switches would be selected as the "source" of the circuit and the other as the "destination."
  (b) The "source" switch then would calculate a path for the circuit using information collected by a routing protocol. The information typically includes network topology and available network resources, to name a few. The path preferably must have sufficient network resources to meet the quality of service requirements of the circuit, for example, bandwidth, delay, to name a few.
  (c) The "source" switch then would set up the circuit using the signaling protocol. A "setup" message is then sent out along the selected path of the circuit. Each switch in the path checks to see if the requested resources are available and then allocates the resources to the circuit. If all switches are able to allocate the resources, then the setup succeeds; otherwise there is failure along the path. An unsuccessful setup attempt may result in a "crankback" to the "source", and as a result it then tries to set the circuit up on a different path. It is preferred that the new path also has sufficient resources to meet the needs of the circuit.

Paths are generated in a variety of ways. For example, paths can be generated by using variants of Dijkstra's shortest path algorithm. This algorithm takes advantage of the fact that each link typically has a provisioned administrative weight. Links may be bi-directional and may have different weights in either direction, but this issue will be ignored for the sake of simplicity. The weight of a path is the sum of the weight of the links in the path. Dijkstra's algorithm seeks to find the path with the minimum weight. It is possible that there may be several paths with identical weights. This is particularly the case when there are several links between a given pair of nodes. Typically, many of these links may be assigned the same weight. Under these conditions, substituting one link for another will result in paths with identical weight.

Typical Dijkstra implementations select among equal weight links (and sometimes paths) in a fixed order. These implementations try to fill up the selected link before another link is selected and in this manner it tries to maximize the fill of the links with circuits on them. The resulting effect is to leave the remaining links empty and thus capable of accepting large circuits.

Under other conditions, a hash function defined on certain parameters could be used to distribute the various circuits over the different links available in a pseudo-random fashion. The hash function concept is more common in traditional IP (Internet Protocol) networks that typically do not do any restoration of circuits.

In pure circuit networks, such as optical networks, it is preferred to leave the maximum available space on (some) links to accommodate large circuits. However, randomized link selection defeats this objective, as circuits will occupy (some) space on all links.

Whenever there is a failure, such as a fiber cut or a switch failure, to name a few, a number of circuits in the link may be impacted. Normally, the switches adjacent to the failure first detect the failure condition. These switches identify the circuits affected by it and then initiate signaling messages to release these circuits. The "release" messages travel back to the "source" and the "destination" of the circuit, releasing all resources held by the circuit along the way. The source switch then needs to determine a new path and tries to establish the failed circuit on this new path. This is called restoring the circuit. The new path must have sufficient resources to meet the needs of the circuit. It must also avoid the failed part of the network. Information about the failed part is disseminated by the routing protocol but there may be a short delay in getting this information. The release and/or crankback message may also contain information regarding where the circuit (setup) failed. Generally, the procedure used to restore the circuit is similar to the method used to provision it in the first place. However, often there are some variations. In some cases, switches pre-calculate a restoration path for each circuit. If this is the case, then this path is attempted first whenever the circuit fails. However, if the setup or restoration attempt on this pre-calculated path fails, then the Dijkstra algorithm may be used to obtain a new path.

Unsuccessful restoration attempts also result in crankbacks, and it is also possible that a circuit may crankback a plurality of times before it is finally restored. Each crankback increases the amount of time the service associated with the circuit suffers an outage. Thus it is also desirable that the number of crankbacks be minimized. The failed circuits all compete for the same available network resources during restoration. It is also possible that there are insufficient network resources to restore all failed circuits. In this case, some of the circuits will not restore and remain in the failed state.

It should also be understood that often there are many types of services that comprise the various circuits. It is an accepted practice to release the failed circuits in a priority order based on the type of service and also to initiate the re-establishment of circuits in a similar priority order. Thus, the higher priority Premium service circuits may be released first and then the lower priority Basic service circuits are released. Similarly, at the source nodes of the released circuits, restoration may be attempted first for the Premium class of circuits and then for the Basic class of circuits.

For successful restoration, particularly with large failure events such as fiber cuts, there must also be adequate spare (restoration) bandwidth in the network. Often a fiber cut takes out several links. Consequently, the network may maintain many spare links' worth of restoration capacity on potential restoration paths. Since failures can occur anywhere in the network, spare restoration capacity is maintained throughout the network.

Once the failure conditions are cleared from the network, the restored circuits may be "reverted" back to their original (service) paths from the restoration paths. This involves releasing the circuit on the restoration path and then setting it up on the original path. The switches typically maintain a record of the original path. Since failure conditions are typically repaired within a short period of time, such as within a few hours, restoration is considered temporary. However, a restored service that stays up for many months or years, like service provisioning, is considered (more) permanent. Thus, as it is desirable to calculate the "best" path during provisioning, similarly restoration may be attempted on any available path, however undesirable. For example, the restoration path may be very long and the restored circuit may thus hold on to a lot of network resources. However, it should be remembered that the circuit will (soon) give up these resources when it reverts.

As stated earlier, this invention overcomes the problems of the prior art in a number of ways, such as to delay the start of the restoration of Basic circuits in all the switches. This could be done in a variety of ways, such as to delay the start of the restoration of Basic circuits in all the switches by a suitable amount of time. This time could depend on the number of Premium and Basic circuits that are expected to fail and can also be provisioned by the administrator of the network. The delayed start of the restoration of the Basic circuits will leave sufficient time for the Premium circuits to restore.

One way to implement this invention would be to introduce a delay parameter that could be provisioned for the Basic circuits in every switch. After a circuit failure, as each release message for a Basic circuit arrives at the "source" switch, the switch would start, for example, a timer for the duration specified by the delay parameter and wait for the expiration of the timer before it initiates the restoration of this Basic circuit. And, after the timer expires, the restoration of the failed Basic circuit would proceed by methods well known in the prior art. It is currently envisioned that this delay parameter would only be used when the failed circuit is being restored.

FIG. 1 is an exemplary network 10 which is used to illustrate the present invention. The network 10 has a plurality of switches (SW) 101-106 and a plurality of point-to-point communication links 201-207. In a typical network 10, switches 101-106 are connected with point-to-point communication links 201-207—for example, OC48 (Optical Carrier level 48), OC12, OC3, DS3 communication links, to name a few. One can also have multiple links between a pair of switches (not shown). Each link 201-207 is bi-directional and with potentially different characteristics in each direction. For example, each link could have different bandwidth (BW) and administrative weight in each direction. For the sake of simplicity, the invention will be illustrated assuming that all the links have the same characteristics in either direction. Switches 101-106 can also automatically discover the network and set up circuits using known link-state routing and signaling protocols. Examples of such switches are optical switches, ATM switches, FR switches, and IP/MPLS routers, and examples of protocols are OSPF (Open Shortest Path First), PNNI (Private Network-to-Network Interface), MPLS (Multi-Protocol Label Switching), to name a few. The switches can also be provisioned with network information. Multiple links can also be grouped into an "aggregated link" to ease the burden of link-state protocol. Circuits are established between a pair of switches and a circuit could traverse multiple switches in between. The (service) route of the circuit is the set of links (and switches) on which it is set up. For ease of understanding, the rest of the invention will be described in terms of optical switches and OC48 links between switches. The point-to-point communication link 201 connects switch 101 and switch 102 to each other.

For the purpose of understanding this invention, let us assume that the link 201 comprises two component OC48 lines; therefore the bandwidth (BW) in the direction from switch 101 to switch 102 would be 96 STS1 (Synchronous Transport Signal level 1) slots (2×OC48). The bandwidth in the direction from switch 102 to switch 101 would be 96 STS1 slots (2×OC48). Let us also assume that the administrative weight in the direction from switch 101 to switch 102 is 200, and the administrative weight in the direction from switch 102 to switch 101 is also 200. Let us also assume that the available bandwidth in the direction from switch 101 to switch 102 would be 10 STS1 slots, and the available bandwidth in the direction from switch 102 to switch 101 would also be 10 STS1 slots. This also implies that the existing circuits are using 86 STS1 slots (96-10).

For the purpose of understanding this invention, let us assume that there is a failure within the network that causes a circuit 301 to fail. The restoration path for the circuit 301 could include switches 101, 104, 105 and 103, and links 205, 206 and 207.

Figure 2:
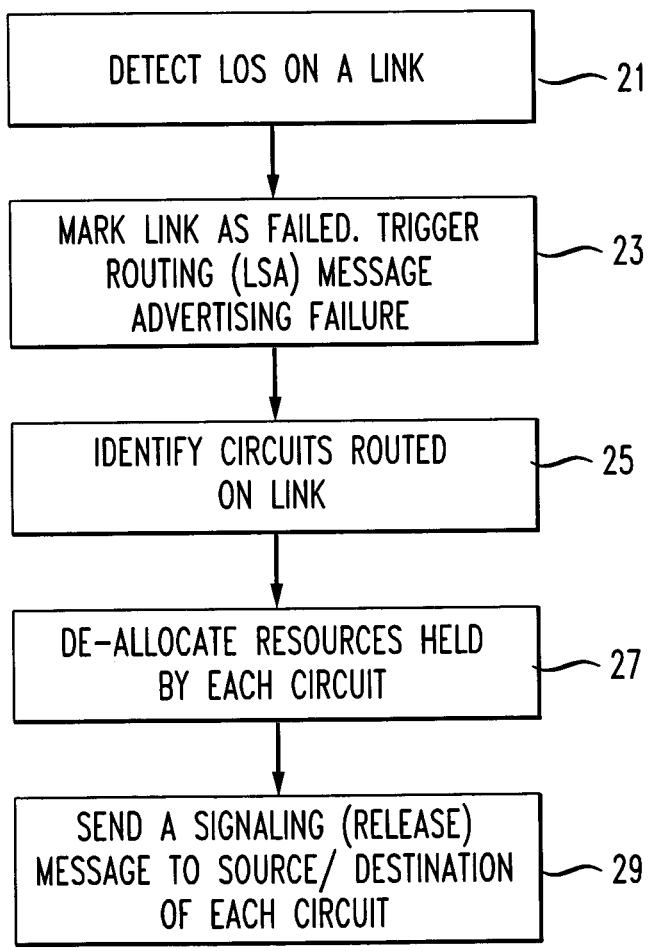
FIG. 2 is a flow diagram to illustrate failure detection and release of affected circuits.

FIG. 2 is a flow diagram illustrating failure detection and release of affected circuits. At step 21 the network detects LOS (Loss of Signal) on a link. At step 23 the link as failed is marked and a routing LSA (Link State Advertisement) message is triggered to advertise the link failure. At step 25 the circuits routed on the link are identified. De-allocation of resources held by each circuit is done at step 27. At step 29 a signal (release) message is sent to source/destination of each circuit. The order in which each of these steps are done can vary.

Figure 3:
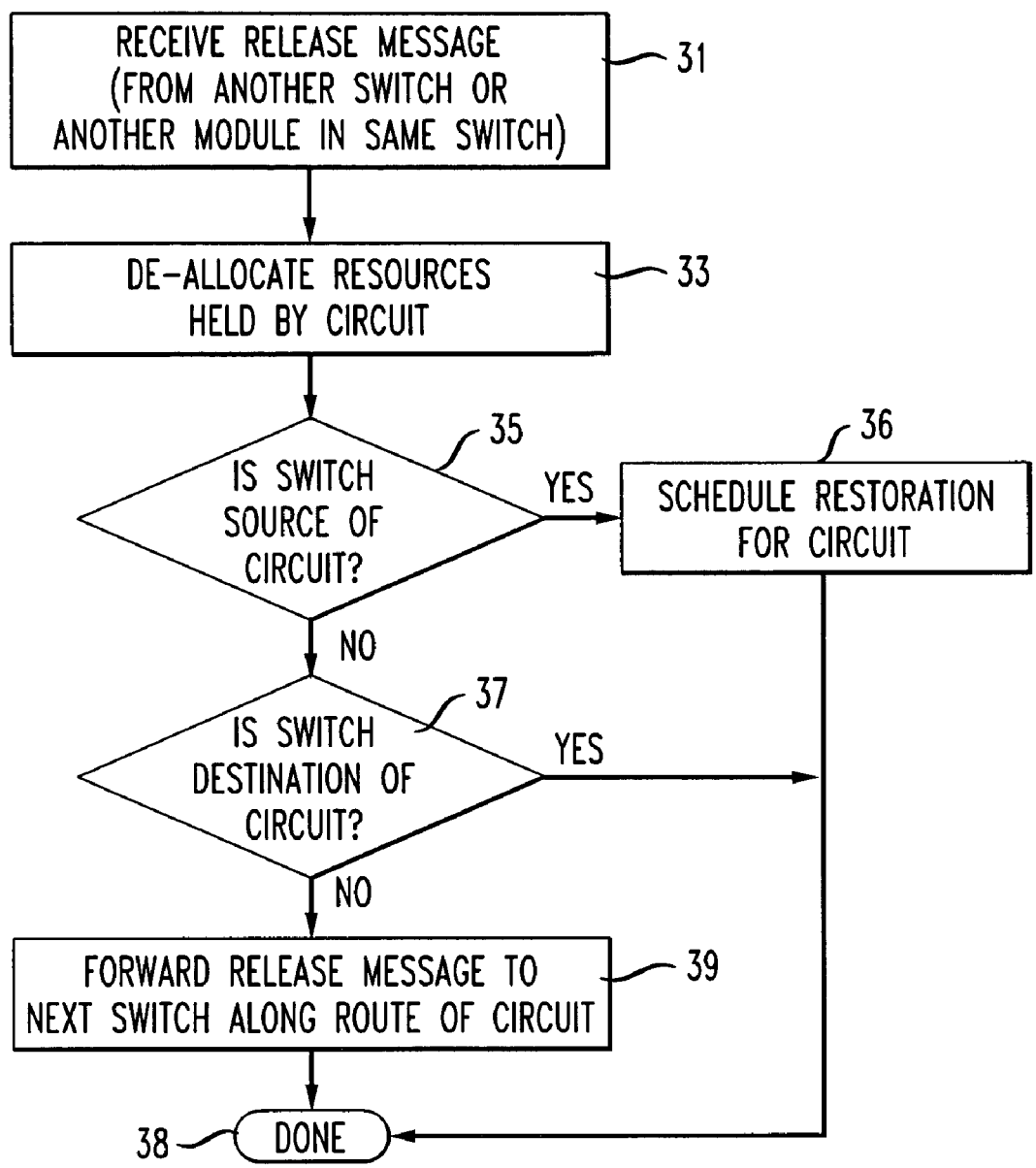
FIG. 3 is a flow diagram to illustrate processing of release messages.

FIG. 3 is a flow diagram illustrating processing of release messages. At step 31 a release message is received. This message could be from another switch or another module in the same switch. De-allocation of resources held by the circuit is done at step 33. At step 35 it is determined whether or not the switch is the source of the circuit. If the switch is the source, then at step 36 the restoration of the circuit is scheduled and the processing of the release completes at step 38. If the switch is not the source, then at step 37 it is determined whether or not the switch is the destination of the circuit. If the switch is the destination, then this process is completed at step 38. If the switch is not the destination, then at step 39 the release message is forwarded to the next switch along the route of the circuit.

Figure 4:
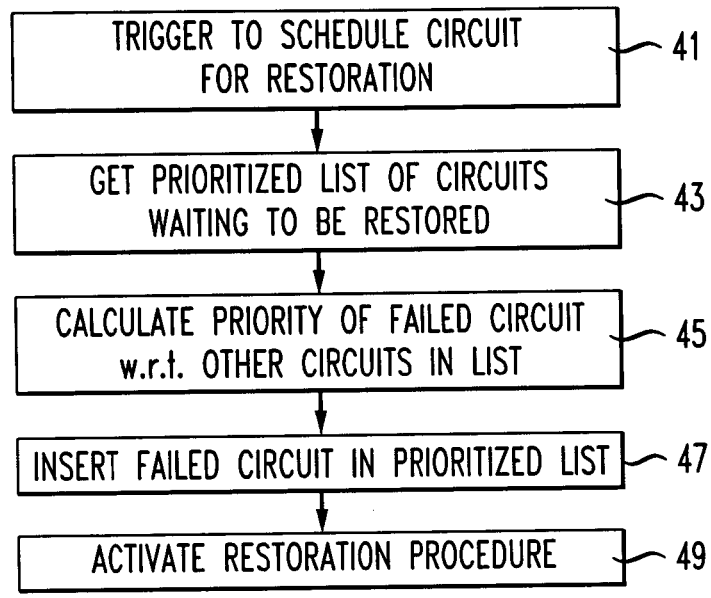
FIG. 4 is a flow diagram to illustrate scheduling restoration of failed circuits.

FIG. 4 is a flow diagram illustrating scheduling restoration of failed circuits. At step 41 a message or trigger is received to schedule restoration for a failed circuit. A prioritized list of circuits waiting to be restored is obtained at step 43. At step 45 priority of failed circuit with respect to other failed circuits on the list is calculated. At step 47 the failed circuit is inserted into the priority list, and the restoration procedure is activated at step 49.

Figure 5:
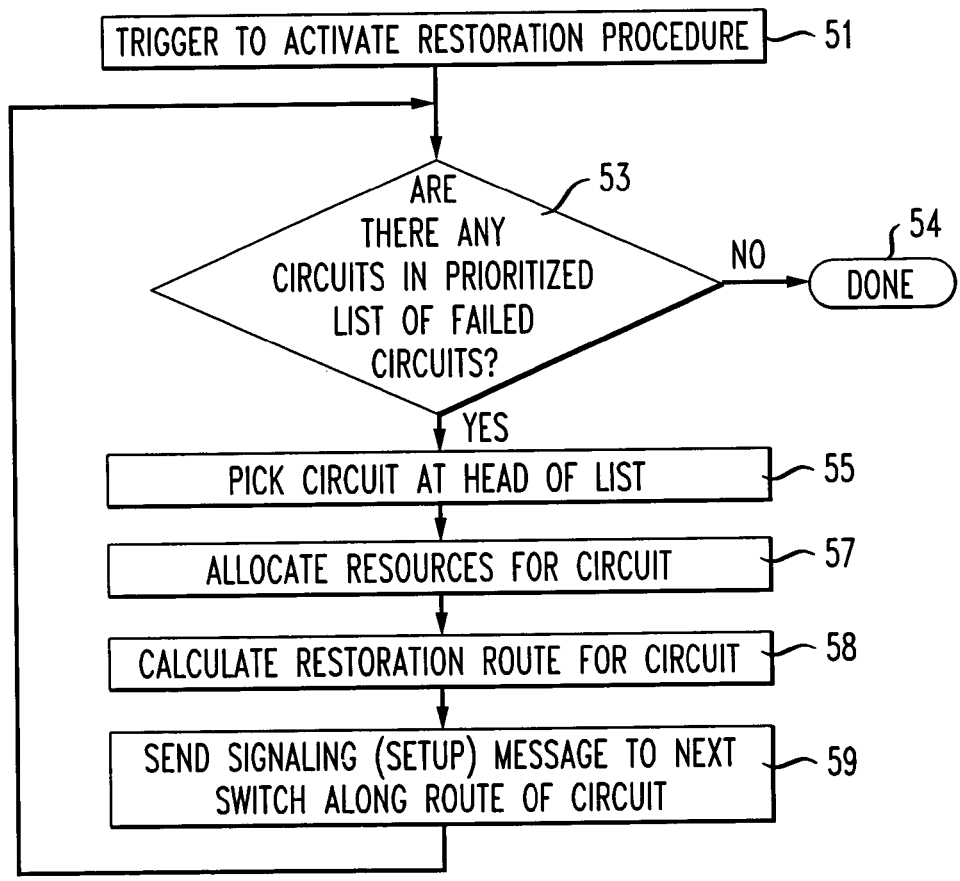
FIG. 5 is a flow diagram to illustrate a restoration procedure.

FIG. 5 is a flow diagram illustrating a restoration procedure. At step 51 a message or trigger is received to start the restoration procedure. At step 53 it is determined if there are any failed circuits in the prioritized list of the failed circuits. If there are no failed circuits, then the restoration procedure is completed at step 54. However, if there are failed circuits, then the circuit at the head of the list or on top of the list is picked at step 55. At step 57 resources needed by this circuit in this switch are allocated. At step 58 the restoration route for the circuit is calculated. A signaling (setup) message to the next switch along the route of circuit is sent at step 59, and step 53 is repeated until the restoration procedure has been completed.

Figure 6:
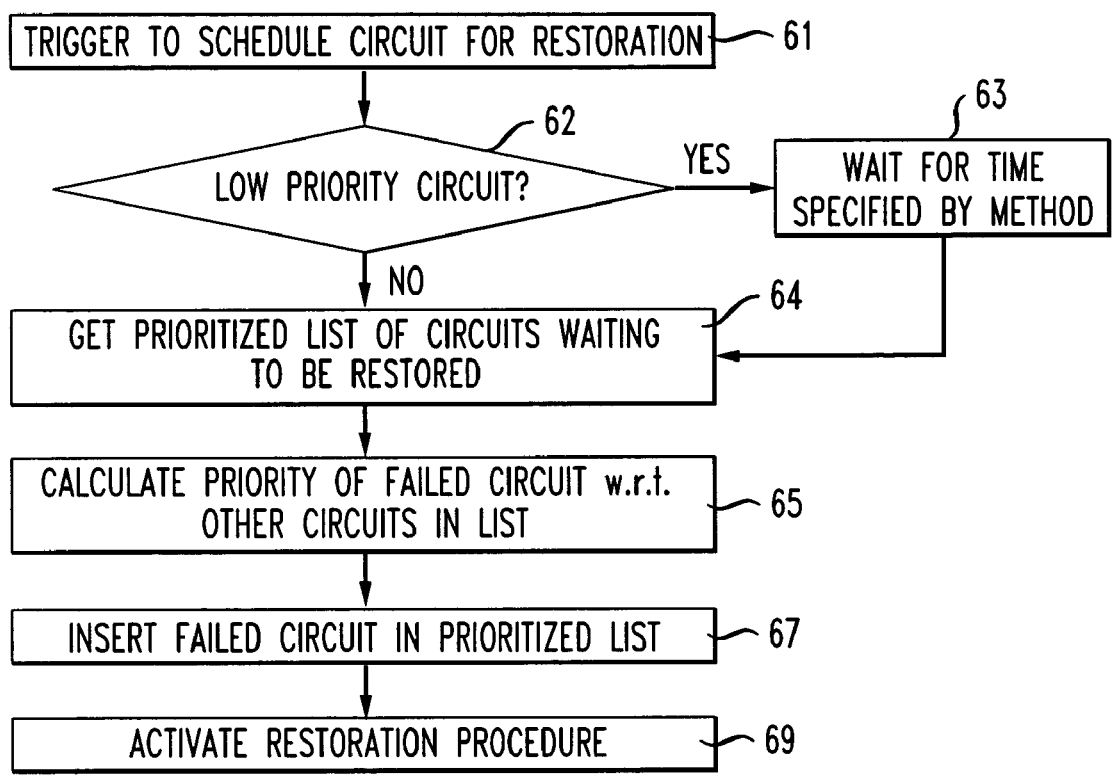
FIG. 6 is a flow diagram to illustrate scheduling restoration of failed circuits using the present invention.

FIG. 6 is a flow diagram illustrating scheduling restoration of failed circuits using the present invention. At step 61 a message or trigger is received to schedule restoration for a failed circuit. At step 62 it is determined whether or not the failed circuit is a low priority circuit. If the failed circuit is a low priority circuit, then at step 63 the restoration has to wait for a time specified as discussed in this invention. If the failed circuit is not a low priority circuit, then at step 64 a prioritized list of circuits waiting to be restored is obtained. At step 65 priority of failed circuit with respect to other circuits in the list is calculated. At step 67 the failed circuit is inserted into the prioritized list. The restoration procedure is activated at step 69.

In one embodiment, the time the restoration has to wait is provisioned in the switches, and the switches simply use this value in step 63. The value could be a fixed number or randomly sampled from a distribution with certain parameters. In another embodiment, as described in FIG. 7, this time is calculated by the switch sending the original release message and is passed in the release message to the switch doing the restoration. The time could be a function of the number of circuits that have failed and could vary from circuit to circuit. For example, if more circuits are failed, then a larger value of time may be used. In yet another embodiment, described in FIG. 8, the switch scheduling the restoration determines the time. Again, it could be a function of the number of releases this switch has received and could vary from circuit to circuit.

Figure 7:
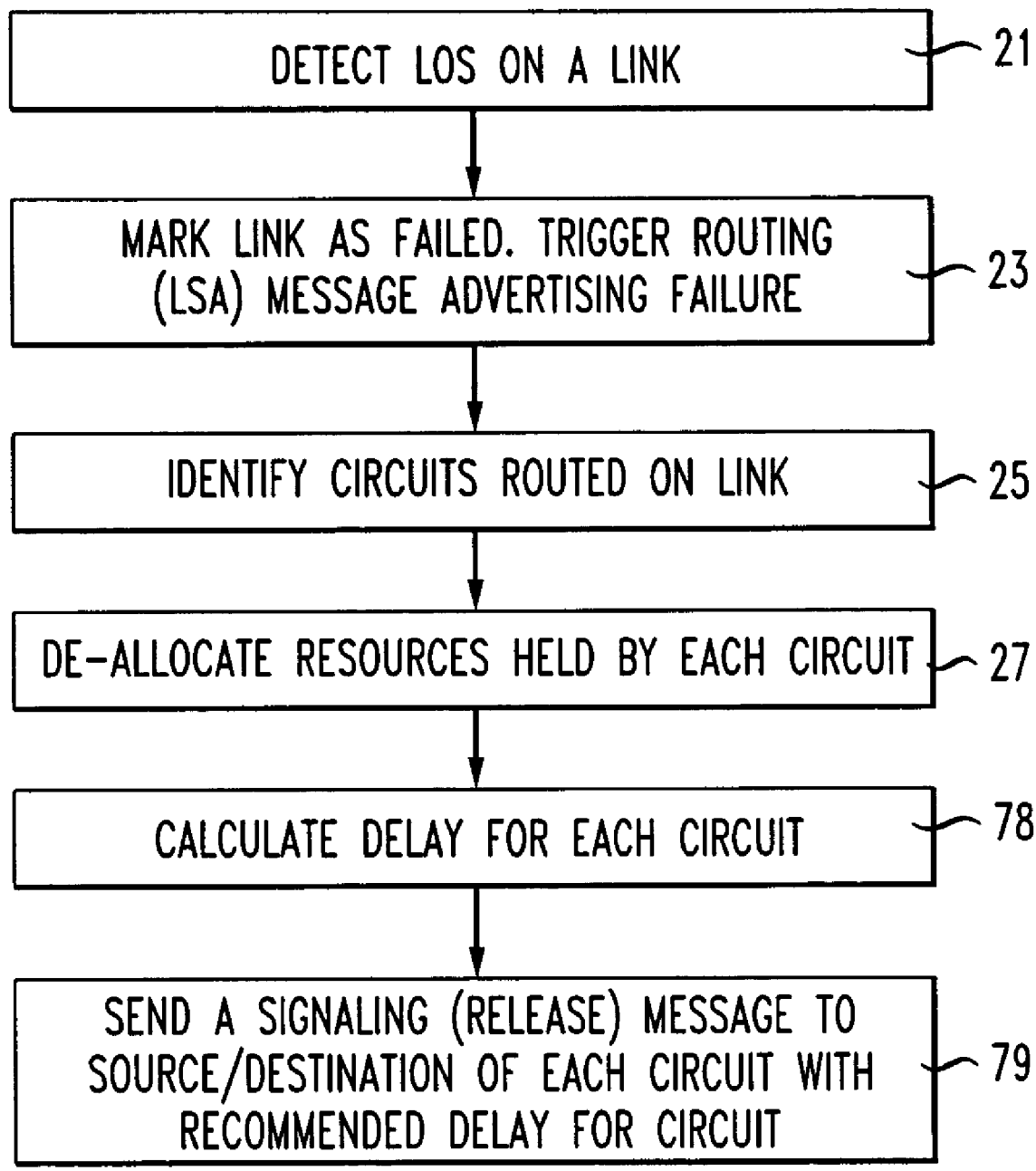
FIG. 7 is a flow diagram to illustrate failure detection and release of affected circuits using the present invention.

FIG. 7 is a flow diagram illustrating failure detection and release of affected circuits using the present invention. At step 21 the network detects LOS (Loss of Signal) on a link. At step 23 the link that has failed is marked and a routing LSA message is triggered to advertise the link failure. At step 25 the circuits routed on the link are identified. De-allocation of resources held by each circuit is done at step 27. At step 78 a delay for each circuit is calculated. At step 79 a signaling (release) message is sent to the source/destination of each circuit with the recommended delay for each of the circuits.

Figure 8:
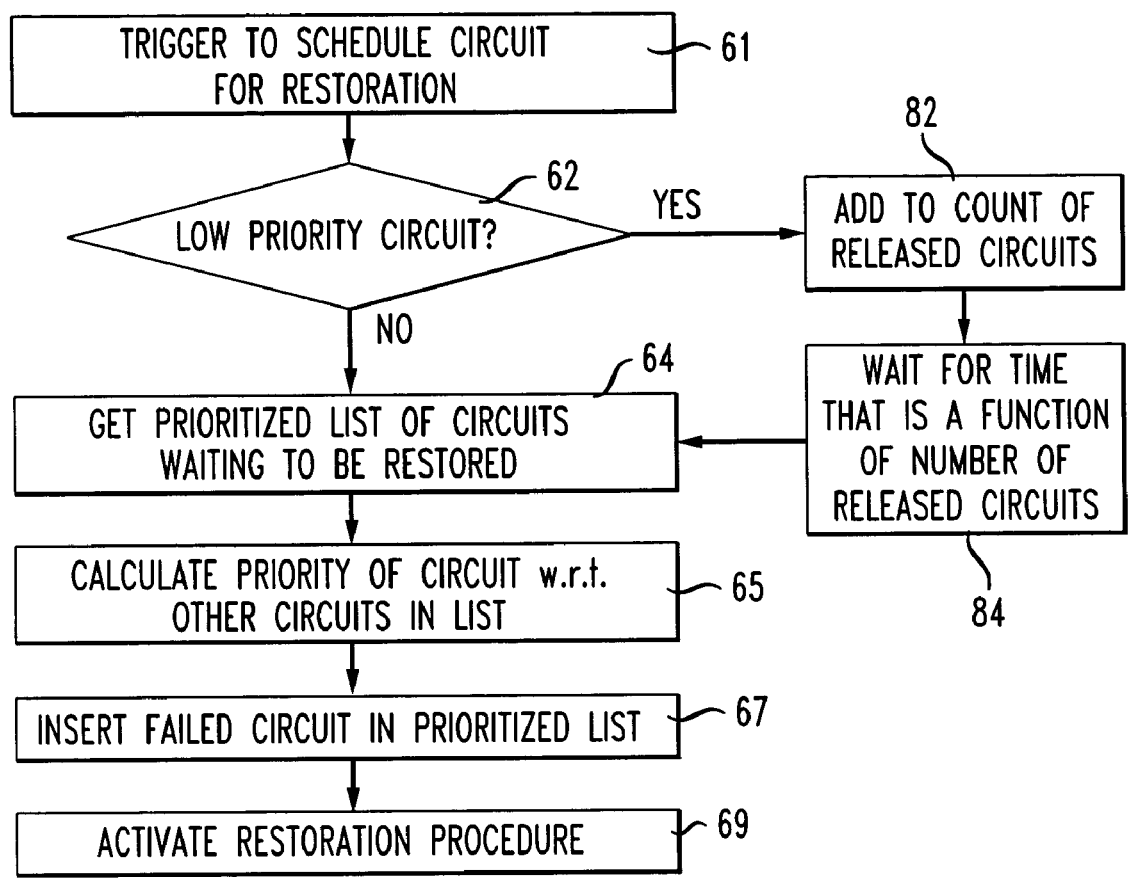
FIG. 8 is a flow diagram to illustrate another embodiment of scheduling restoration of failed circuits using the present invention.

FIG. 8 is a flow diagram illustrating another embodiment of scheduling restoration of failed circuits using the present invention. At step 61 a message or trigger is received to schedule restoration for a failed circuit. At step 62 it is determined whether or not the failed circuit is a low priority circuit. If the failed circuit is a low priority circuit, then at step 82 it is added to the count of released circuits. Then at step 84 the process has to wait for a time that is a function of number of released circuits and then step 64 is triggered. If the failed circuit is not a low priority circuit, then at step 64 a prioritized list of circuits waiting to be restored is obtained. At step 65 priority of a failed circuit with respect to other circuits in the list is calculated. At step 67 the failed circuit is inserted into the prioritized list. The restoration procedure is activated at step 69. It should be appreciated that step 82 could also be performed between steps 62 and 64. Additionally, any function can be used in step 84.

This invention can be easily extended to a plurality of classes of services. Multiple delay parameters can also be provisioned in the switches, one for each class of service. The highest priority service class need not be delayed—that is, it's delay parameter could be set at zero.

The delay parameter could be different for different switches. The amount a circuit is to be delayed could be also be specified by the switch releasing the circuit in the release message for the circuit. Thus, the release message could be modified to carry the amount of the desired delay.

Instead of a fixed amount of delay for a service class, this amount could vary based on the number of circuits affected by the failure. It could be a step function based on the number of releases that arrive at a switch. For example, the first 5 Basic circuit releases arriving at a switch within a certain time interval could be delayed by an amount equal to the delay parameter, the next 5 by twice the delay parameter, and so on. The switches will need to implement a way to count the number of releases in time intervals of specified sizes and also have a way to provision how the varying delay amount is to be calculated. The variable delays could also be specified by the switch releasing the circuits.

The switch releasing the circuits could calculate a delay parameter for each circuit based on all failed circuits. For example, it could simulate the restoration paths for each circuit, decide which circuits may compete with each other for network resources, and then decide to delay certain circuits by specified amounts of time to minimize the contention for network resources seen by higher priority services. A wide variety of methods can be used to do these calculations.

The timer used to delay a circuit may be jittered, as it is standard practice to generally jitter timers in routing and signaling protocols.

This invention is applicable to other MPLS-based IP (Internet Protocol) networks and the traditional ATM and Frame Relay (FR) networks as well. This invention can also be used with any communication network with switches capable of establishing circuits—for example, Frame Relay switches, ATM switches, IP/MPLS routers, Optical switches, digital and optical cross-connects, to name a few.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for restoring failed circuits within a communication network, comprising the steps of:
    (a) identifying at least one failed circuit,
    (b) triggering at least one delay parameter for the restoration of said failed circuit,
    (c) determining if the failed circuit is a low priority circuit, and
    (d) if said failed circuit is a low priority circuit then waiting for a specific triggering event to initiate said restoration.

2. The method of claim 1, wherein the delay parameter is provisioned for each circuit.

3. The method of claim 1, wherein a release message arriving at a source switch of the failed circuit triggers said at least one delay parameter.

4. The method of claim 1, wherein a release message arriving at a source switch of the failed circuit carries said at least one delay parameter.

5. The method of claim 1, wherein said at least one delay parameter is selected from a group consisting of a timer, a fixed value, a variable delay function and a step delay function.

6. The method of claim 1, wherein different classes of services have different delay parameters.

7. The method of claim 1, wherein a first circuit has at least one first delay parameter, and a second circuit has at least one second delay parameter.

8. The method of claim 1, wherein a first switch has at least one first delay parameter, and a second switch has at least one second delay parameter.

9. The method of claim 1, wherein a timer used to delay circuit restoration is jittered.

10. The method of claim 1, further comprising generating at least one list of at least one failed circuit waiting to be restored.

11. The method of claim 10, further comprising inserting at least one new failed circuit in said list and updating said list.

12. The method of claim 1, further comprising generating at least one priority list of at least one failed circuit waiting to be restored.

13. The method of claim 12, further comprising inserting at least one new failed circuit in said priority list and updating said priority list.

14. The method of claim 1, further comprising calculating delay for each failed circuit and sending at least one release message to a source and/or destination of each circuit with said calculated delay.

15. A method for restoring failed circuits within a communication network comprising the steps of:
    (a) identifying at least one failed circuit, and
    (b) triggering at least one schedule for the restoration of said failed circuit,
    wherein at least one of said at least one failed circuit has at least one delay parameter.

16. A method for restoring failed circuits within a communication network, comprising the steps of:
    identifying at least one failed circuit,
    determining service priority of said failed circuit,
    obtaining a priority list of other circuits waiting to be restored,
    calculating the priority of said failed circuit with respect to other circuits on said list, and
    inserting said failed circuit in said priority list and activating at least one restoration procedure for said failed circuit,
    wherein if the service priority of said failed circuit is low, then adding at least one delay parameter in the restoration procedure.

17. A method for restoring failed circuits within a communication network, comprising the steps of:
    (a) detecting loss of service on at least one link,
    (b) advertising failure of said at least one link,
    (c) identifying at least one failed circuit on said link,
    (d) determining service priority of said at least one failed circuit,
    (e) de-allocating resources held by each circuit on said link
    (f) calculating delay for each circuit on said link, and
    (g) sending at least one message to each source and/or destination of each circuit with recommended delay for each of said failed circuit.

18. The method of claim 17, wherein the delay for each circuit is calculated based on the service priority of said failed circuit.

19. A method for triggering a schedule for restoration of failed circuits within a communication network, comprising the steps of:
    identifying at least one failed circuit,
    determining service priority of said failed circuit,
    obtaining a priority list of other circuits waiting to be restored,
    calculating priority of said failed circuit with respect to other failed circuits on said list, and
    inserting said failed circuit in said priority list and activating at least one restoration procedure for the restoration of said failed circuit,
    wherein if the service priority of said failed circuit is low, then adding at least one delay parameter in the restoration procedure of said failed circuit.

20. A method in which failed circuits within a communication network are inserted into a prioritized list for restoration and are thereafter restored based on their position in the list, the method comprising delaying the insertion of at least an identified one of said failed circuits into the list, said failed circuit being identified based on at least one criterion.

21. The method of claim 20 wherein said criterion is that said failed circuit belongs to a particular class of circuits.

22. The method of claim 21 wherein the amount of delay depends on which of a plurality of classes of circuits said failed circuit belongs to.

23. The method of claim 21 wherein said particular class of circuits comprises circuits that have a lower priority than other circuits within said communication network.

24. The method of claim 20 wherein the amount of delay is determined individually for said failed circuit.

25. The method of claim 20 wherein said method is performed by a switch within said network that was the source switch of said failed circuit.

26. The method of claim 25 wherein the amount of delay is contained in a release message received by said source switch.

27. The method of claim 25 wherein the amount of delay is based on the number of circuits sourced at said source switch.

28. The method of claim 20 wherein said network comprises a plurality of switches, wherein said method is performed by one of said switches, and wherein the amount of delay is a function of which of said plurality of switches is performing said method.

29. The method of claim 20 wherein said network comprises a plurality of switches, wherein an individual one of said switches determines the amount of delay and sends a message containing the determined delay to at least a switch within said network that was the source switch of said failed circuit, and wherein said method is performed by said source switch.

30. The method of claim 29 wherein said individual one of said switches is a switch adjacent to the failure of said failed circuit and wherein said message is release message.

31. A method for use in a communication network that comprises switches interconnected by links, at least ones of said links having respective circuits thereon, the method comprising detecting that at least one of said links has failed, and initiating the restoration of failed circuits that were on the failed link, the restoration of at least one of said failed circuits being delayed by at least a selected amount of delay, wherein the amount of said delay depends on which one of a plurality of classes of circuits said failed circuit belongs to.

32. The method of claim 31 wherein said one of said classes of circuits comprises circuits that have a lower priority than other circuits within said communication network.

33. A method for use in a communication network that comprises switches interconnected by links, at least ones of said links having respective circuits thereon, the method comprising detecting that at least one of said links has failed, and initiating the restoration of failed circuits that were on the failed link, the restoration of at least one of said failed circuits being delayed by at least a selected amount of delay, wherein the amount of said delay is determined individually for said failed circuit.

34. The method of claim 31 wherein said method is performed by a switch within said network that was the source switch of said failed circuit.

35. The method of claim 34 wherein the amount of said delay is contained in a release message arriving at said source switch.

36. The method of claim 34 wherein the amount of said delay is based on the number of circuits sourced at said source switch.

37. The method of claim 31 wherein said network comprises a plurality of switches, wherein said method is performed by one of said switches, and wherein the amount of said delay is a function of which of said plurality of switches is performing said method.

38. The method of claim 31 wherein said network comprises a plurality of switches, wherein an individual one of said switches determines the amount of said delay and sends a message containing the determined delay to at least a switch that was a source switch of said failed circuit, and wherein said method is performed by said source switch.

39. The method of claim 38 wherein said individual one of said switches is a switch adjacent to the failure of said failed circuit and wherein said message is release message.

40. Apparatus for use in a communication network through which a plurality of circuits have been established, the apparatus being adapted to
receive indications that particular ones of said circuits have failed, and
initiate a restoration for at least ones of said failed circuits,
the apparatus being further adapted to ensure that, for each of particular identified ones of said failed circuits, there is at least a predetermined amount of delay between a) the receipt of the indication that that circuit had failed and b) initiation of the restoration of that failed circuit,
the apparatus being further adapted to identify said failed circuit based on its belonging to a particular class of circuits.

41. The invention of claim 40 wherein the amount of said delay depends on said particular class of circuits.

42. The invention of claim 40 wherein said particular class of circuits comprises circuits that have a lower priority than other circuits within said communication network.

43. The invention of claim 40 wherein the amount of said delay is determined individually for said failed circuit.

44. The invention of claim 40 wherein said apparatus is further adapted to be a source switch in said communication network.

45. The invention of claim 44 wherein said apparatus is further adapted to determine the amount of said delay based on the number of circuits sourced thereat.

46. The invention of claim 40 wherein said apparatus is further adapted to determine the amount of said delay from a received release message.

* * * * *